US010353716B2

(12) United States Patent
Ganesh

(10) Patent No.: US 10,353,716 B2
(45) Date of Patent: Jul. 16, 2019

(54) AUTOMATED DEPLOYMENT AND PERFORMANCE EVALUATION OF A VIRTUALIZED-COMPUTING ENVIRONMENT

(71) Applicant: International Business Machines Corporation, Armonk, NY (US)

(72) Inventor: Tinniam Venkataraman Ganesh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 15/810,194

(22) Filed: Nov. 13, 2017

(65) Prior Publication Data

US 2019/0146810 A1    May 16, 2019

(51) Int. Cl.
*G06F 9/44* (2018.01)
*G06F 9/445* (2018.01)
*H04L 12/24* (2006.01)
*G06F 9/455* (2018.01)
*G06F 9/50* (2006.01)
*H04L 12/911* (2013.01)

(52) U.S. Cl.
CPC ...... *G06F 9/44505* (2013.01); *G06F 9/45558* (2013.01); *G06F 9/5027* (2013.01); *G06F 9/5061* (2013.01); *H04L 41/5045* (2013.01); *H04L 47/822* (2013.01); *H04L 47/823* (2013.01)

(58) Field of Classification Search
CPC ........................................................ G06F 9/44
USPC ........................................................ 718/1
See application file for complete search history.

(56) References Cited

U.S. PATENT DOCUMENTS

| 8,261,295 | B1 | | 9/2012 | Risbood et al. |
| 9,483,258 | B1 | * | 11/2016 | Labat ........................ G06F 8/65 |
| 2004/0210623 | A1 | * | 10/2004 | Hydrie ................ H04L 12/4641 |
| | | | | 709/201 |
| 2010/0262559 | A1 | * | 10/2010 | Wilcock ................. G06Q 10/00 |
| | | | | 705/348 |
| 2015/0007177 | A1 | * | 1/2015 | Tobo ................... G06F 9/45533 |
| | | | | 718/1 |

(Continued)

OTHER PUBLICATIONS

Rodrigo N. Calheiros et al, CloudSim: A Novel Framework for Modeling and Simulation of Cloud Computing Infrastructures and Services, Cornell University Library,Technical Report, GRIDS-TR-2009-1, Grid Computing and Distributed Systems Laboratory, The University of Melbourne, Australia, Mar. 13, 2009, 9 pages.

*Primary Examiner* — Jae U Jeon
(74) *Attorney, Agent, or Firm* — Schmeiser, Olsen & Watts; Mark C. Vallone

(57) ABSTRACT

A virtual-computing environment definition language automates the deployment of a virtualized computing environment. A set of basic requirements of a planned virtual computing environment is described in the definition language to provide a concise, textual representation of the planned environment's architecture. This representation also predicts the planned environment's performance characteristics as a function of expected workloads, such as expected numbers of concurrent users or expected numbers of concurrent transactions. The definition-language representation is then translated into an orchestration template from which virtual resources are provisioned and the virtual-computing environment deployed.

17 Claims, 9 Drawing Sheets

(56) References Cited

U.S. PATENT DOCUMENTS

2015/0134716 A1 5/2015 Nugent
2016/0269319 A1 9/2016 Wise et al.

* cited by examiner

```
heat_template_version: 2013-05-23 description: Simple template to deploy a stack with two virtual machine
instances parameters:
  image_id_1:
    type: string
    label: Image ID
    description: SCOIMAGE Specify an image name for instance1
    default: cirros-0.3.1-x86_64
  image_id_2:
    type: string
    label: Image ID
    description: SCOIMAGE Specify an image name for instance2
    default: cirros-0.3.1-x86_64
  network_id:
    type: string
    label: Network ID
    description: SCONETWORK Network to be used for the compute instance resources:
  my_instance1:
    type: OS::Nova::Server
    properties:
      image: { get_param: image_id_1 }
      flavor: m1.small
      networks:
        - network : { get_param : network_id }
  my_instance2:
    type: OS::Nova::Server
    properties:
      image: { get_param: image_id_2 }
      flavor: m1.tiny
      networks:
        - network : { get_param : network_id }
```

FIG. 7

AUTOMATED DEPLOYMENT AND PERFORMANCE EVALUATION OF A VIRTUALIZED-COMPUTING ENVIRONMENT

BACKGROUND

The present invention relates to the planning and deployment of virtualized computing environments and in particular to using a cloud-definition language (CDL) to translate a set of requirements into a concise representation of the computing environment.

Embodiments of the present invention may use this CDL-based representation to generate an orchestration template from which an automated system can deploy the computing environment and predict its performance.

When a provider of virtual services, such as cloud provider, receives a client request for a virtual infrastructure component, a software application, a virtualized computing platform, or another virtual service, the provider may be expected to quickly design and deploy a complex virtualized computing environment. Such deployments must be performed with a high degree of reliability and with a minimal risk of reducing the provider's available resources to an unacceptable level.

Known cloud-deployment systems can automate certain steps of this procedure, but they do not offer end-to-end automation. Nor can they accurately predict a requested service's critical performance characteristics, such as throughput or response time, even when they can estimate future levels of network traffic and know the service provider's available resource levels.

This problem, rooted in automated-deployment technology, has been partially addressed by the use of cloud-orchestration templates. Such a template file may contain a generalized text-based description of a cloud service that can be customized into a detailed orchestration template that contains sufficient detail to allow the resource to be provisioned, orchestrated, or deployed.

One example of such a mechanism is the Heat service of the open-source OpenStack cloud-computing platform. Heat allows a cloud manager to automatically deploy a cloud-computing environment, a virtual machine, virtual infrastructure, or other instances of a virtual service by using a simple, human-readable language to describe the requested instances in a Heat-compatible orchestration template. Such a template may be created by adding instance-specific details to a generalized template written to accommodate the general class of requested service. The resulting orchestration template may then be processed by the OpenStack's automatic deployment system to fully deploy the requested instance.

Text-based templates used by services like Heat are intended to be manually generated by human cloud designers who have experience writing simple code. But this means that a template can be generated only after a designer has manually completed the time-consuming and technically complex task of designing a cloud architecture capable of satisfying user requirements.

This task becomes even more challenging when the designer must estimate performance characteristics or resource requirements of the requested services. Although it may be relatively simple to use empirical data or historical logs to predict the response time or throughput of a simple implementation, predicting the performance of a complex computing environment can be an enormous task.

Known automated orchestration mechanisms thus do not fully automate the task of deploying a cloud-computing service, infrastructure, application, or platform defined by a set of user requirements. Nor do they provide a manageable means of projecting estimated performance characteristics of a complex virtualized computing environment.

SUMMARY

An embodiment of the present invention is an automated cloud-deployment system that includes a processor, memory, and a computer-readable hardware storage device containing software to perform automated deployment of a cloud-computing environment. The system receives a set of requirements that describe virtual components, a topology, and the expected workload of the cloud-computing environment. The system retrieves empirical data from which may be inferred performance characteristics of each virtual component. The system then represents the planned cloud-computing environment's topology as a block of cloud-definition language (CDL) code, from which may be estimated the planned environment's response time and throughput as functions of workload. The system translates the CDL a template-based orchestration template and uses that template to automatically deploy the cloud-computing environment.

Another embodiment of the present invention is a method for automated deployment of a cloud-computing environment. An automated cloud-deployment system that includes a processor, memory, and a computer-readable hardware storage device containing software to perform automated deployment of a cloud-computing environment. The system receives a set of requirements that describe virtual components, a topology, and the expected workload of the cloud-computing environment. The system retrieves empirical data from which may be inferred performance characteristics of each virtual component. The system then represents the planned cloud-computing environment's topology as a block of cloud-definition language (CDL) code, from which may be estimated the planned environment's response time and throughput as functions of workload. The system translates the CDL into a template-based orchestration script and uses that template to automatically deploy the cloud-computing environment.

Yet another embodiment of the present invention is a computer program product that includes a computer-readable storage medium. The storage medium contains software that allows an automated deployment of a cloud-computing environment to perform a method for automated deployment of a cloud-computing environment. An automated cloud-deployment system that includes a processor, memory, and a computer-readable hardware storage device containing software to perform automated deployment of a cloud-computing environment. The system receives a set of requirements that describe virtual components, a topology, and the expected workload of the cloud-computing environment. The system retrieves empirical data from which may be inferred performance characteristics of each virtual component. The system then represents the planned cloud-computing environment's topology as a block of cloud-definition language (CDL) code, from which may be estimated the planned environment's response time and throughput as functions of workload. The system translates the CDL into a template-based orchestration template and uses that template to automatically deploy the cloud-computing environment.

BRIEF DESCRIPTION OF THE DRAWINGS

FIG. 7 shows a second example of an orchestration template, derived in conformance with embodiments of the present invention

DETAILED DESCRIPTION

Figure 1:
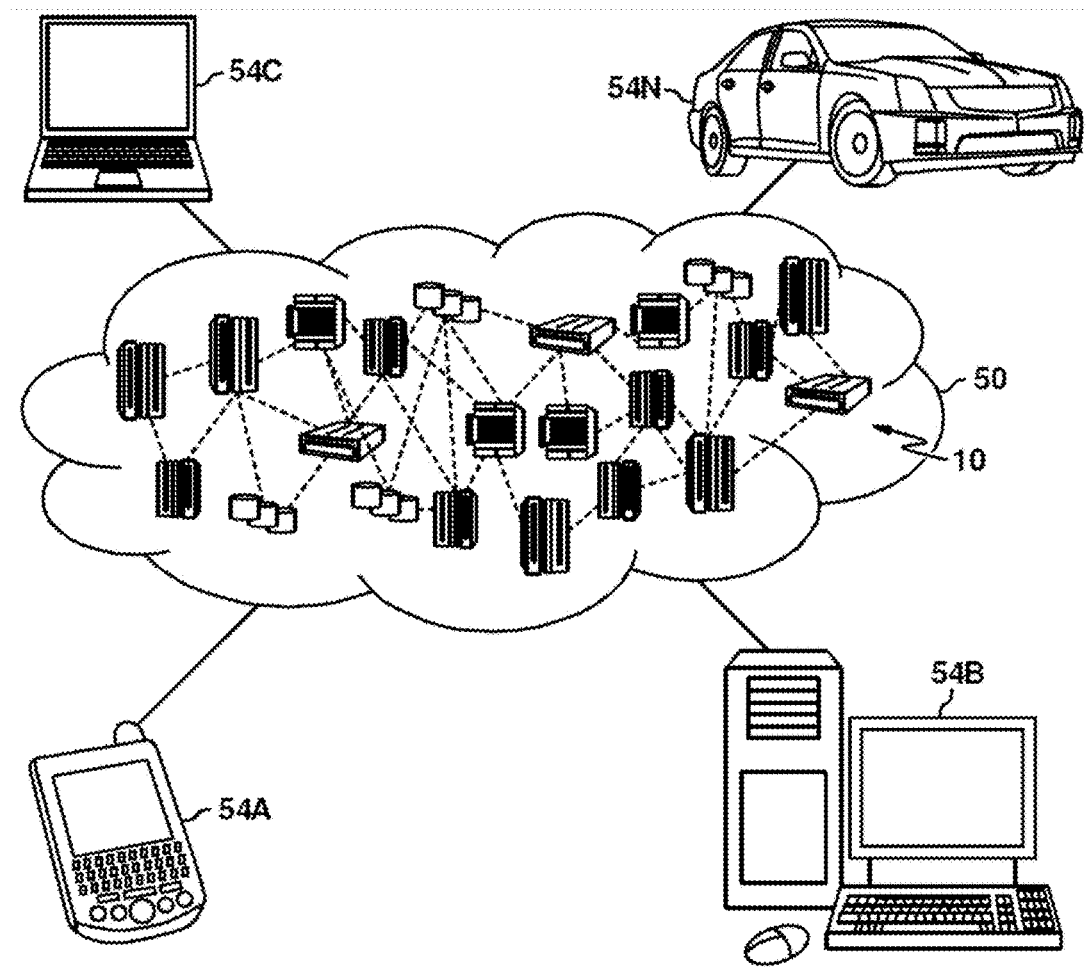
FIG. 1 depicts a cloud computing environment according to an embodiment of the present invention.

Embodiments of the present invention improve known methods of using templates to automate the orchestration and deployment of a virtualized computing environment. These improvements comprise automating the front-end steps that previously required of a skilled administrator or designer to manually generate an orchestration template from which a target environment may be deployed.

Although humans are capable of manually producing orchestration templates, such as the "Heat templates" produced by the OpenStack Heat service, such human steps are significantly different than the language-driven methodology comprised by embodiments and examples described in this document. The present invention describes a simple cloud-definition language (CDL) that requires only a general set of requirements (such as a list of entities to be deployed and elements of a general architecture) and, optionally, performance logs of previous deployments, to create a finished template. Embodiments of the present invention, as well as other types of known deployment-automation technologies, can use then these templates to fully deploy a cloud-computing environment.

Embodiments of the present invention thus provide fully automated cloud-deployment capabilities, from the requirements phase to final orchestration.

Although embodiments and examples disclosed in this document may refer to cloud-computing environments, the present invention is flexible enough to accommodate any sort of computing environment capable of being described by a language analogous to the cloud-definition language described below. Such environments may comprise, for example, combinations of other types of virtualized computing environments with distributed systems like client-server systems and enterprise networks.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
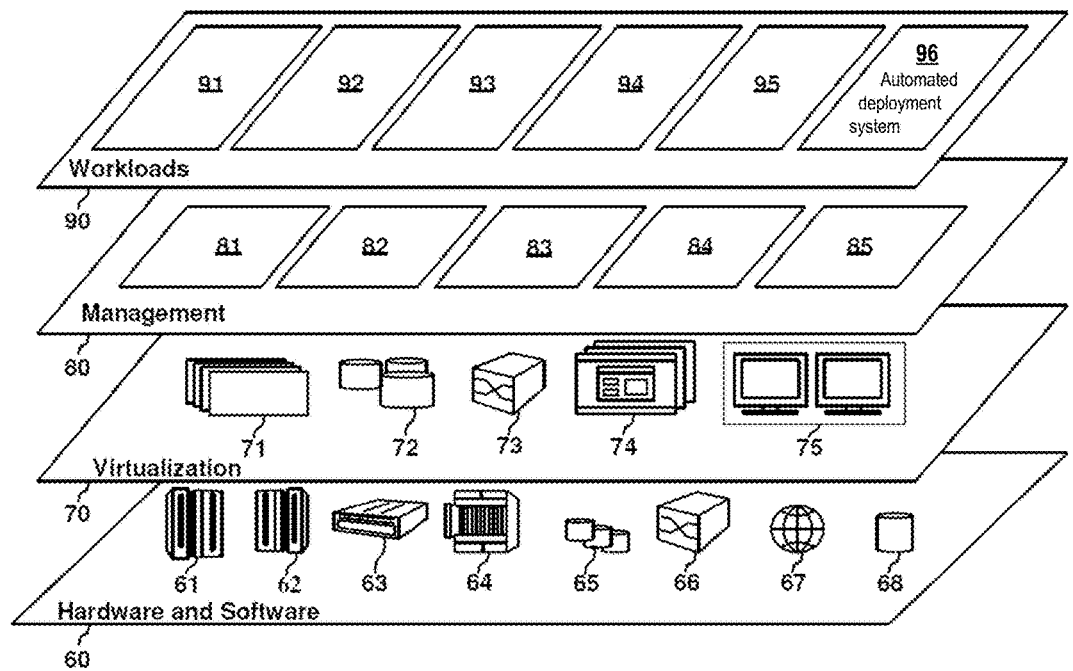
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93, data analytics processing 94; transaction processing 95; and orchestration of complex.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
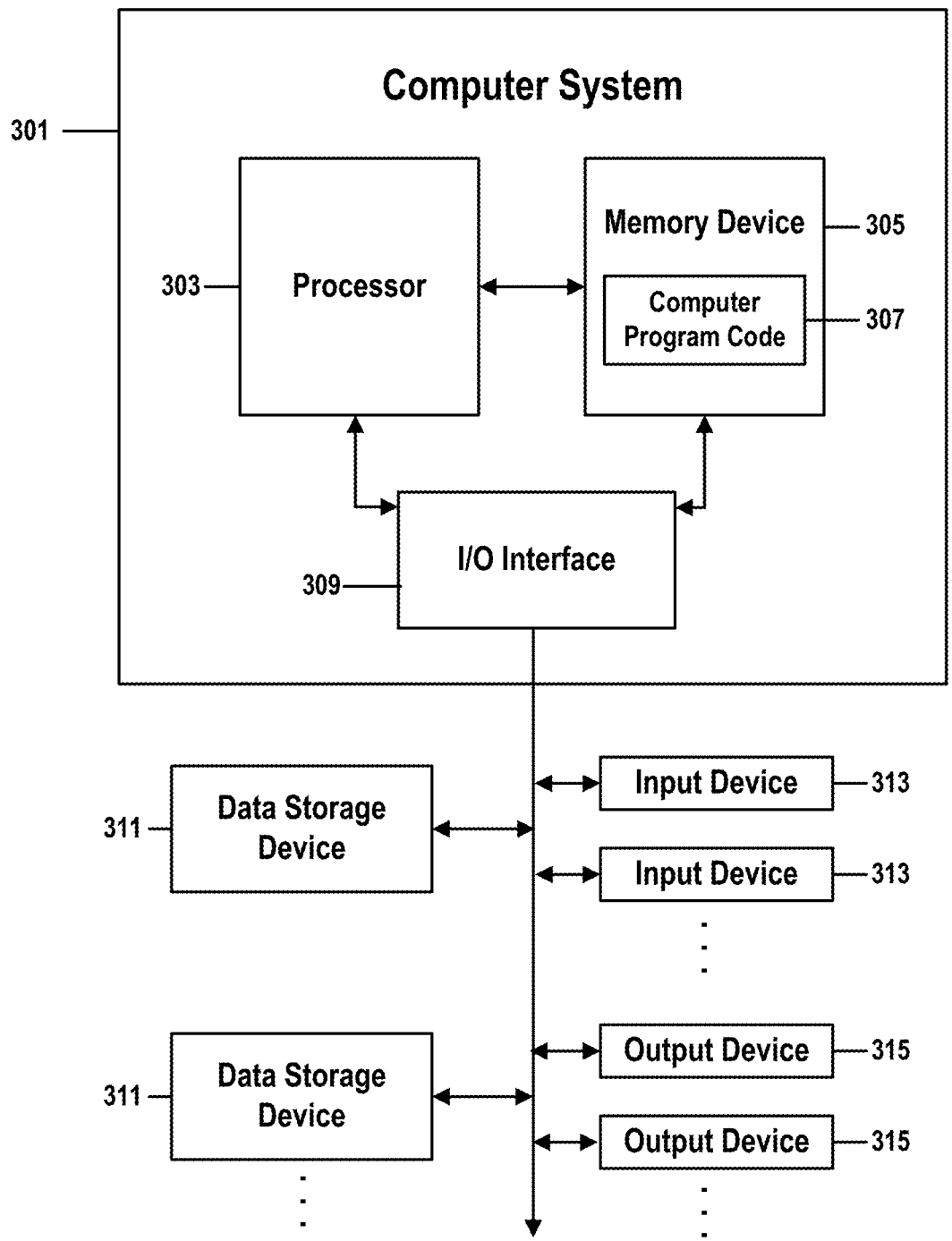
FIG. 3 shows the structure of a computer system and computer program code that may be used to implement a method for automated deployment of a cloud-computing environment in accordance with embodiments of the present invention.

FIG. 3 shows a structure of a computer system and computer program code that may be used to implement a method for automated deployment of a cloud-computing environment in accordance with embodiments of the present invention. FIG. 3 refers to objects 301-315.

In FIG. 3, computer system 301 comprises a processor 303 coupled through one or more I/O Interfaces 309 to one or more hardware data storage devices 311 and one or more I/O devices 313 and 315.

Hardware data storage devices 311 may include, but are not limited to, magnetic tape drives, fixed or removable hard disks, optical discs, storage-equipped mobile devices, and solid-state random-access or read-only storage devices. I/O devices may comprise, but are not limited to: input devices 313, such as keyboards, scanners, handheld telecommunications devices, touch-sensitive displays, tablets, biometric readers, joysticks, trackballs, or computer mice; and output devices 315, which may comprise, but are not limited to printers, plotters, tablets, mobile telephones, displays, or sound-producing devices. Data storage devices 311, input devices 313, and output devices 315 may be located either locally or at remote sites from which they are connected to I/O Interface 309 through a network interface.

Processor 303 may also be connected to one or more memory devices 305, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 305 contains stored computer program code 307, which is a computer program that comprises computer-executable instructions. The stored computer program code includes a program that implements a method for automated deployment of a cloud-computing environment in accordance with embodiments of the present invention, and may implement other embodiments described in this specification, including the methods illustrated in FIGS. 1-7. The data storage devices 311 may store the computer program code 307. Computer program code 307 stored in the storage devices 311 is configured to be executed by processor 303 via the memory devices 305. Processor 303 executes the stored computer program code 307.

In some embodiments, rather than being stored and accessed from a hard drive, optical disc or other writeable, rewriteable, or removable hardware data-storage device 311, stored computer program code 307 may be stored on a static, nonremovable, read-only storage medium such as a Read-Only Memory (ROM) device 305, or may be accessed by processor 303 directly from such a static, nonremovable, read-only medium 305. Similarly, in some embodiments, stored computer program code 307 may be stored as computer-readable firmware 305, or may be accessed by processor 303 directly from such firmware 305, rather than from a more dynamic or removable hardware data-storage device 311, such as a hard drive or optical disc.

Thus the present invention discloses a process for supporting computer infrastructure, integrating, hosting, maintaining, and deploying computer-readable code into the computer system 301, wherein the code in combination with the computer system 301 is capable of performing a method for automated deployment of a cloud-computing environment.

Any of the components of the present invention could be created, integrated, hosted, maintained, deployed, managed, serviced, supported, etc. by a service provider who offers to facilitate a method for automated deployment of a cloud-computing environment. Thus the present invention discloses a process for deploying or integrating computing infrastructure, comprising integrating computer-readable code into the computer system 301, wherein the code in combination with the computer system 301 is capable of performing a method for automated deployment of a cloud-computing environment.

One or more data storage units 311 (or one or more additional memory devices not shown in FIG. 3) may be used as a computer-readable hardware storage device having a computer-readable program embodied therein and/or having other data stored therein, wherein the computer-readable program comprises stored computer program code 307. Generally, a computer program product (or, alternatively, an article of manufacture) of computer system 301 may comprise the computer-readable hardware storage device.

In embodiments that comprise components of a networked computing infrastructure, a cloud-computing environment, a client-server architecture, or other types of distributed platforms, functionality of the present invention may be implemented solely on a client or user device, may be implemented solely on a remote server or as a service of a cloud-computing platform, or may be split between local and remote components.

While it is understood that program code 307 for a method for automated deployment of a cloud-computing environment may be deployed by manually loading the program code 307 directly into client, server, and proxy computers (not shown) by loading the program code 307 into a computer-readable storage medium (e.g., computer data storage device 311), program code 307 may also be automatically or semi-automatically deployed into computer system 301 by sending program code 307 to a central server (e.g., computer system 301) or to a group of central servers. Program code 307 may then be downloaded into client computers (not shown) that will execute program code 307.

Alternatively, program code 307 may be sent directly to the client computer via e-mail. Program code 307 may then either be detached to a directory on the client computer or loaded into a directory on the client computer by an e-mail option that selects a program that detaches program code 307 into the directory.

Another alternative is to send program code 307 directly to a directory on the client computer hard drive. If proxy servers are configured, the process selects the proxy server code, determines on which computers to place the proxy servers' code, transmits the proxy server code, and then installs the proxy server code on the proxy computer. Program code 307 is then transmitted to the proxy server and stored on the proxy server.

In one embodiment, program code 307 for a method for automated deployment of a cloud-computing environment is integrated into a client, server and network environment by providing for program code 307 to coexist with software applications (not shown), operating systems (not shown) and network operating systems software (not shown) and then installing program code 307 on the clients and servers in the environment where program code 307 will function.

The first step of the aforementioned integration of code included in program code 307 is to identify any software on the clients and servers, including the network operating system (not shown), where program code 307 will be deployed that are required by program code 307 or that work in conjunction with program code 307. This identified software includes the network operating system, where the network operating system comprises software that enhances a basic operating system by adding networking features. Next, the software applications and version numbers are identified and compared to a list of software applications and correct version numbers that have been tested to work with program code 307. A software application that is missing or that does not match a correct version number is upgraded to the correct version.

A program instruction that passes parameters from program code 307 to a software application is checked to ensure that the instruction's parameter list matches a parameter list required by the program code 307. Conversely, a parameter passed by the software application to program code 307 is checked to ensure that the parameter matches a parameter required by program code 307. The client and server operating systems, including the network operating systems, are identified and compared to a list of operating systems, version numbers, and network software programs that have been tested to work with program code 307. An operating system, version number, or network software program that does not match an entry of the list of tested operating systems and version numbers is upgraded to the listed level on the client computers and upgraded to the listed level on the server computers.

After ensuring that the software, where program code 307 is to be deployed, is at a correct version level that has been tested to work with program code 307, the integration is completed by installing program code 307 on the clients and servers.

Embodiments of the present invention may be implemented as a method performed by a processor of a computer system, as a computer program product, as a computer system, or as a processor-performed process or service for supporting computer infrastructure.

Figure 4:
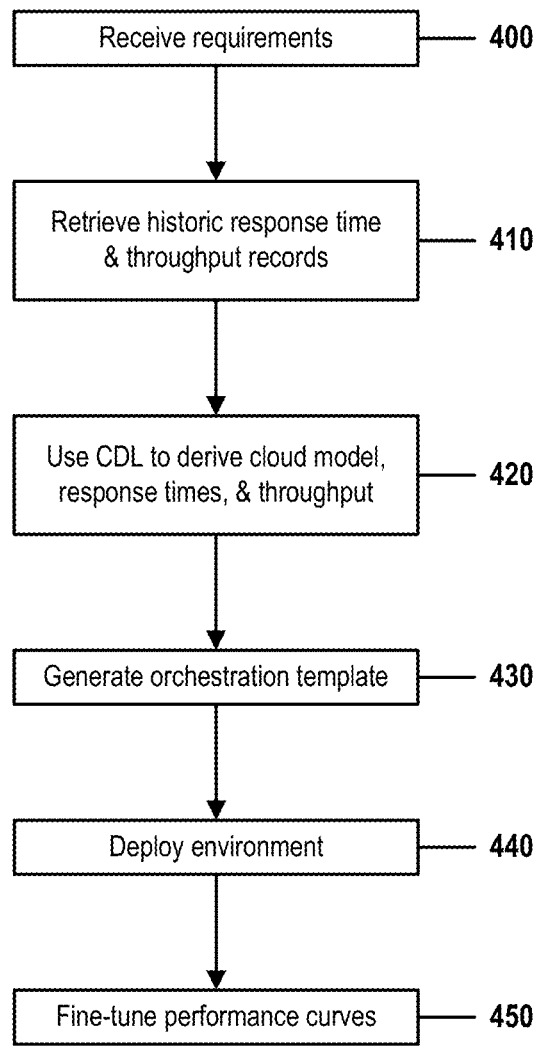
FIG. 4 is a flow chart that illustrates steps of a method for automated deployment of a cloud-computing environment in accordance with embodiments of the present invention.

FIG. 4 is a flow chart that illustrates the steps of a method for automated deployment of a cloud-computing environment in accordance with embodiments of the present invention. FIG. 4 contains steps 400-450 which may be performed by embodiments that incorporate the structures of FIGS. 1-3.

In step 400, a manual or computerized component of an automated cloud-deployment system receives a set of requirements for a virtualized computing environment (such as a cloud-computing environment). These requirements may be as complex as desired by an implementer, but must include list of the virtual machines or services to be provisioned in the environment. The requirements may also specify basic characteristics of the planned implementation, such as a specification of whether instances of the required virtual entities to be provisioned will be configured to operate in parallel or sequentially; expected workloads, such as an average or maximum number of concurrent users or an average or maximum number of concurrent transactions, and identifications of template files that may be used to provision or configure instances of required virtual entities.

The system may also receive in step 400 other information related to the planned cloud-computing environment that is not already available to the system. Such information may, for example, include configuration information or past performance characteristics of the virtualization platform from which the planned environment is to be provisioned.

In step 410, the cloud-deployment system receives historic records or empirically determined data that identify throughput figures, response times or latency times, or other performance characteristics of cloud services or virtual machines similar to those identified in step 400. Such information may include previously stored logs of past performance characteristics of standardized cloud services under certain loads.

The records received in 410 may express any of these parameters as functions of a maximum or average number of concurrent users, of a maximum or average number of concurrent transactions, or of any other sort of workload that an implementer deems relevant.

Figure 6A:
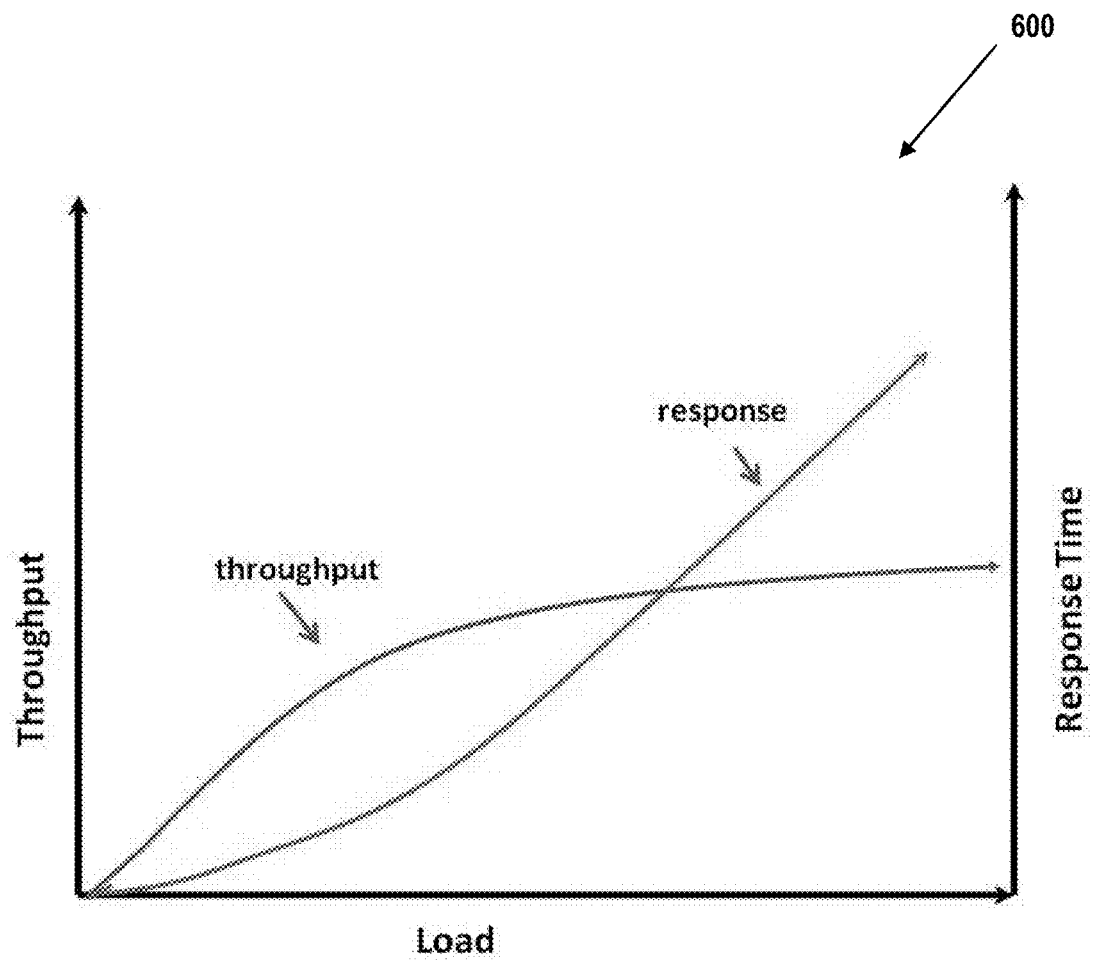
FIG. 6A shows an example of a performance function, in conformance with embodiments of the present invention.

In some embodiments, such a function itself may be expressly received in step 410. For example, if a planned cloud comprises a particular type of transaction-processing application provisioned on a particular class of server, the system may in step 410 receive information identifying that the throughput of such an application/server combination increases linearly as the number of concurrent users increases from 1 user to 100 users, but does not increase further as the number of users rises above 100. Such a function may be expressed in any form known in the art, such as a mathematical equation, as a table of sample points for different numbers of users, in graphical form, or as a natural-language description that may be interpreted by known NLP or other types of semantically aware software. FIG. 6A shows one example of such a function.

In step 420, the system generates CDL code that represents the cloud-computing environment to be implemented. This code is generated as a function of information received in steps 400 and 410. Examples of generated code and the environments with which the examples are associated, are described below and shown in FIGS. 5A-7.

The present invention is flexible enough to accommodate any coding conventions that are desired by an implementer or that are required for compatibility with downstream modules, such as instruction sequencing or naming conventions. Specific characteristics of the CDL code may, for example, be chosen to facilitate an automated deployment according to conventions of a particular deployment mechanism, such as UDCP (Urban Code Deploy with Patterns), OpenStack and Heat, or Microsoft Azure.

In all cases, the generated CDL code will enumerate each instance of the services or components to be deployed, and identify which instances are to be deployed in series or in parallel.

This CDL code may then be used to estimate the response time (or latency time) and throughput of the virtualized environment to be deployed. These performance characteristics may be derived from historic data, logs, functional representations, or other empirical data received in step 400 or 410 that describes performance characteristics of previously deployed virtualized services. The system may derive performance characteristics of the entire virtual environment by using the concise CDL definition of that environment to determine the environment's topology. Examples of how such derivations may occur are described in FIGS. 5A-7.

In step 430, the system generates an orchestration template by customizing one or more predefined template files. This customization may be performed by any means known in the art. For example, if each template describes one type of requested virtual service in general terms, the system may represent a requested instance in the template as a corresponding template enhanced with instance-specific details received in step 400. These customized templates may be organized in the template as a function of the topology of the requested computing environment. That topology may be inferred from CDL code's concise definition of the requested environment.

In one example, an orchestration template or script might comprise a description of each instance of a service or virtual component to be deployed, such as a listing of each instance's image name and network ID, and a description of system resources required by each instance. More detailed examples are described in FIGS. 5A-7.

In some embodiments, the orchestration template generated in this step may conform to conventions of popular deployment or orchestration services, such as UDCP, the open-source OpenStack Heat service, Amazon AWS Cloud Formation, or Microsoft's Azure Resource Manager.

In step 440, the system automatically deploys the planned computing environment. As is known in the art, automatic deployment may be accomplished by provisioning and configuring instances of virtual resources, using settings identified by the orchestration template generated in step 430.

In step 450, the system tracks performance parameters associated with the deployed computing environment, such as throughput and response times or latency times. These parameters may each characterize either the entire environment or a subset of the virtual entities comprised by the environment. Some or all of the tracked performance parameters may each be associated with a workload, such as a number of concurrent users or transactions, at the time that the performance parameter is sampled. These tracked figures may then be stored as historic records that will be retrieved at a later time, such as during the next performance of step 400 or 410.

Figure 5A:
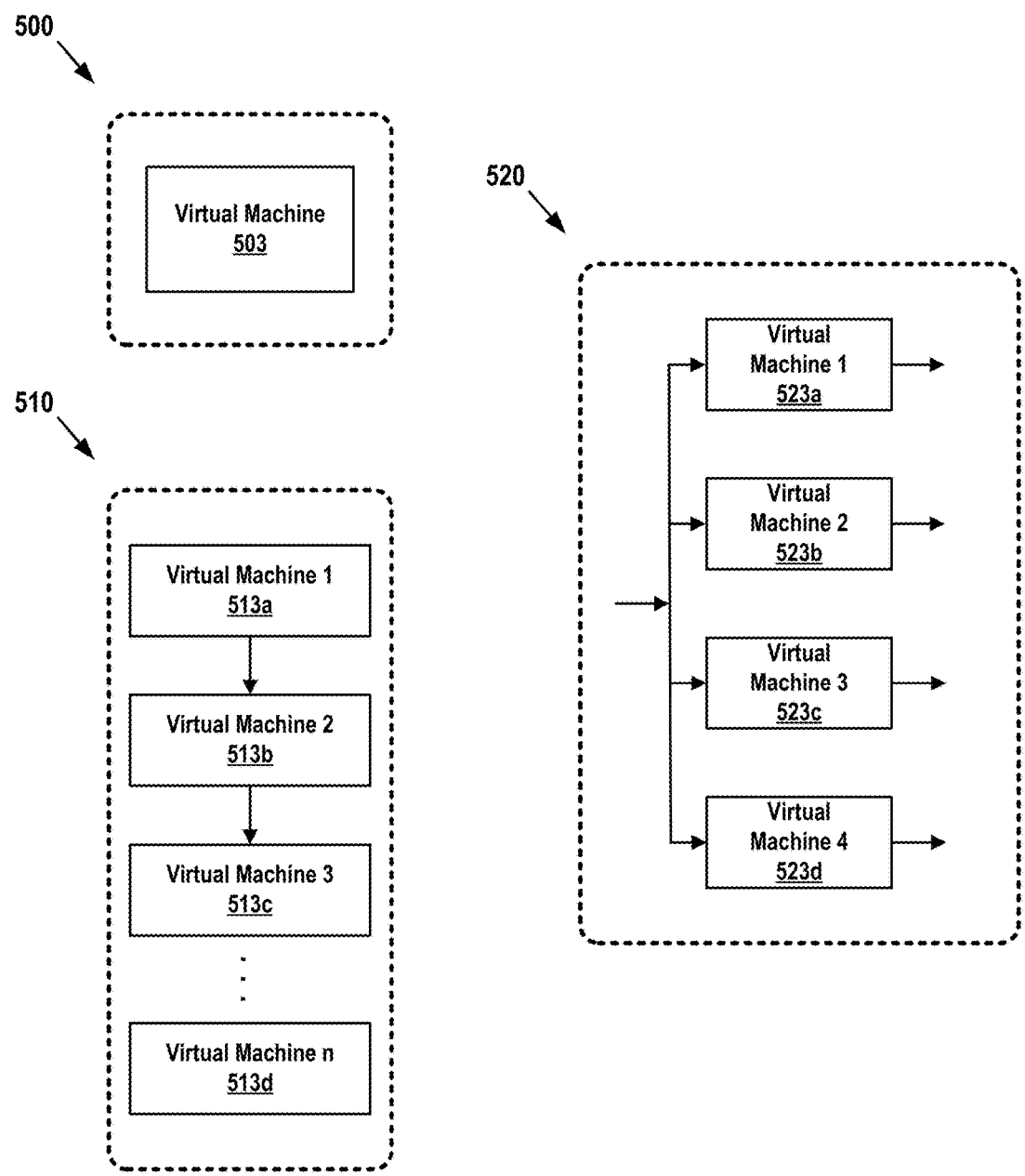
FIGS. 5A and 5B show architectures of virtualized computing environments referenced in examples of the present invention described in FIGS. 6A-7.
Figure 5B:
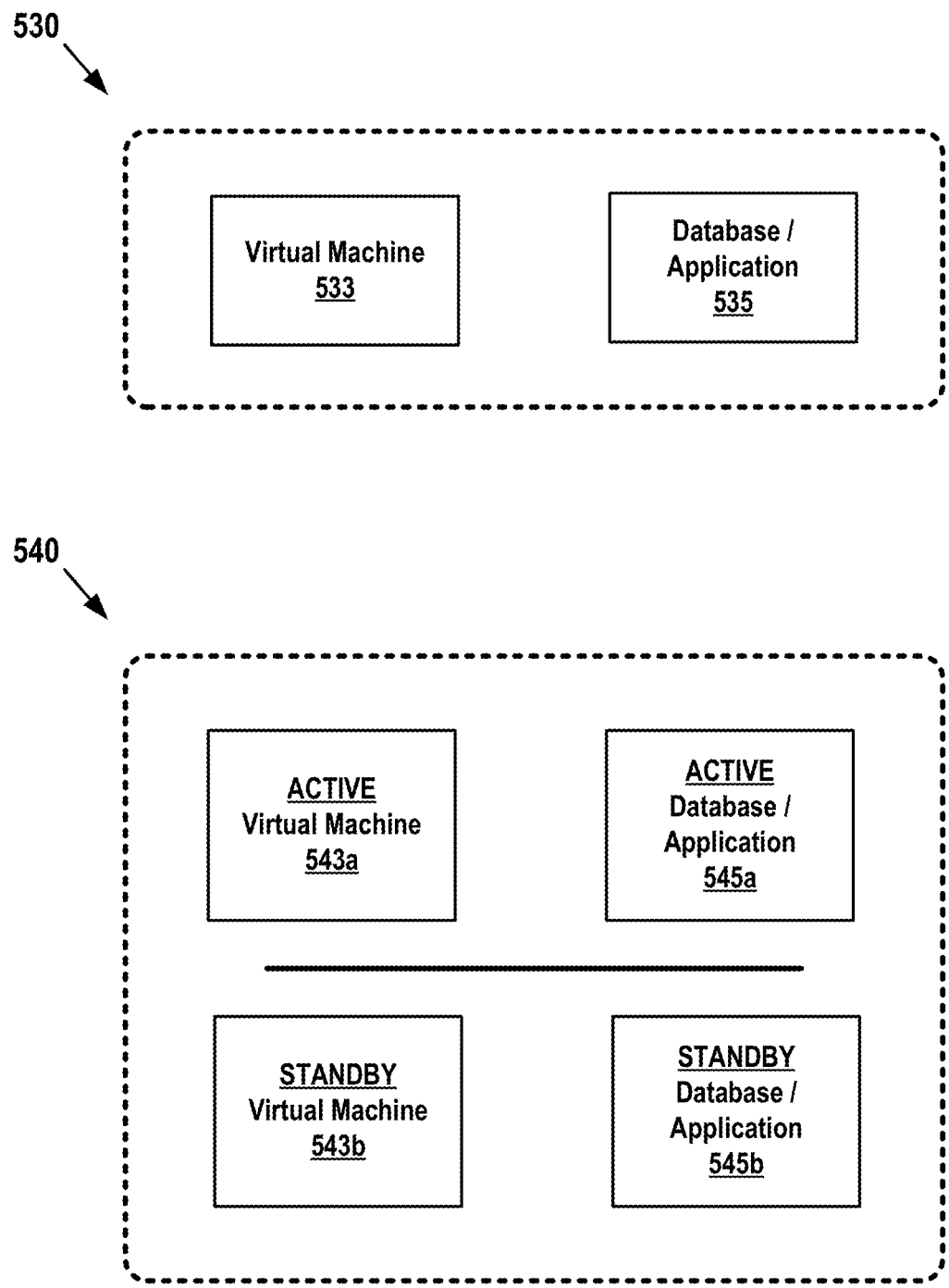

FIGS. 5A and 5B shows architectures of virtualized computing environments that are referenced om examples of the present invention described in FIGS. 6A-7. FIG. 5A shows items 500-523d and FIG. 5B shows items 530-545d.

The fact that the examples of FIGS. 5A and 5B are based on cloud-computing environments should not be construed to limit embodiments of the present invention to automated deployment of cloud-computing environments. Other embodiments may use procedures analogous to those described in these examples to automatically deploy other types of virtualized computing environments and non-virtualized computing environments.

In FIG. 5A, simple cloud configuration 500 contains one independently operating virtual machine 503.

Cloud configuration 510 contains a sequence of n virtual machines 513a, 513b, 513c, through 513d that are configured to operate in sequential order. That is, each pair of adjacent machines 513a-513d is in a dependency relationship such that the output of VM1 513a is the input of VM2 513b, the output of VM2 513b is the input of VM3 513c, and so forth, through the final Virtual Machine n 513d.

Cloud configuration 520 contains a set of 4 virtual machines 523a, 523b, 523c, through 523d that are configured to operate in parallel. In this example, machines configured in parallel may, for example, be configured to operate in a load-balanced configuration, where workloads of each parallel machine may be adjusted in order to better balance the workloads or performance of the entire group or of a subset of machines in the group.

In FIG. 5B, cloud configuration 530 contains one virtual machine 533 and one database or application 535.

Configuration 540 shows a high-availability analog of cloud configuration 530. This configuration 540 run active/standby mode, in which a "primary" or "active" instance of virtual machine 543a and database/application 545a normally receives and processes user requests, and identical "passive" or "standby" virtual machine 543b and database/application 545b normally receive the same requests but do not process them. The passive/standby entities 543b and 545b become active, and begin to process user requests, only when a normally active instance 543a or 545a fails. Once the failed instance 543a or 545a is repaired, the system returns to its normal operating state, in which all four entities 543a-545b receive user requests, but only the normally active entities 543a and 545a process those requests.

FIG. 6A shows a graph 600 of an exemplary performance function based on exemplary cloud configuration 500 of FIG. 5, in conformance with embodiments of the present invention.

In the example of cloud 500, the system would in step 400 of FIG. 4 receive a set of requirements that describe components to be deployed in cloud-computing environment 500, as well as projected workloads expected to be handled by the described components. Here, those components consist of only one virtual machine 503. In the following examples, virtual machine 503 and cloud 500 will be referred to as virtual machine V 503 and cloud $C_M$ 500.

In step 410, the system receives historic records or empirically determined data that describes performance characteristics (such as the function shown in graph 600) of previously deployed instances of V 503. Because cloud $C_M$ 500 contains only virtual machine V 503, these performance characteristics 600 also estimate performance of cloud $C_M$ 500. These performance characteristics 600 may be received in known form and by any known methods, including those described in steps 400 and 410 of FIG. 4.

In this example, graph 600 of FIG. 6A represents one possible format of the received functions Graph 600 represents the expected response times and throughput of cloud $C_M$ 500 as a function of load, where load may be interpreted as a number of concurrent users or concurrent transactions. This function may have been determined as a function of logged performance characteristics of virtual machines of the same class as virtual machine V 503, and may be further refined by the tracking operation of step 450 of FIG. 4. Although axis units have been omitted from graph 600 for pedagogical reasons, in a real-world implementation, the graph 600 would present quantitative results.

The function described by graph 600 shows that, when virtual machines similar to V 503 have been deployed in the past, their response times and throughput have been a function of cloud traffic $t_R$.

Response times, for example, are seen to increase exponentially, and are thus proportional to a function $$e^{t_R} \qquad (01)$$

Graph 600 further shows that throughput figures for the class of virtual machines similar to that of V 503 increased and then plateaued in a manner that is proportional to the algebraic function $$\frac{t_R}{\sqrt{(1+t_R)}} \qquad (02)$$

or to the equivalent trigonometric hyperbolic tangent function $\tan h(t_R)$.

The system, upon having received information indicating that cloud $C_M$ 500 consists of a single virtual machine V 503, may describe the architecture of resulting cloud $C_M$ as a single-line block of CDL:

$$C_M = V \qquad (10)$$

Here, line (10) states that requested cloud $C_M$ will contain only virtual machine V 503.

Furthermore, the system, upon having received historical information from which may be inferred that the performance of V 503 will be proportional to the above functions, can express predicted performance characteristics of cloud $C_M$ as:

$$C_M = f(r,t) \qquad (20)$$

$$C_M(r) = \alpha e^{t_R} + \beta \qquad (30)$$

$$C_M(t) = \gamma \left( \frac{t_R}{\sqrt{(1+t_R)}} \right) + \delta \qquad (40a)$$

$$C_M(t) = \gamma * \tan h(t_R) + \delta \qquad (40b)$$

Equation (20) states that cloud $C_M$ may be described as a function of cloud $C_M$'s response time r and throughput t.

Equation (30) defines the expected response time $C_M(r)$ of cloud $C_M$ as being proportional to exponential function $e^{t_R}$. Here, coefficients α and β may be determined empirically, in order to quantify function $C_M(r)$, from information received in step 400, 410, or 450 of FIG. 4.

Equations (40a) and (40b) define the expected throughput performance $C_M(t)$ of cloud $C_M$ as being proportional to the function of equation (02). Here, coefficients γ and δ may be determined empirically, in order to quantify function $C_M(t)$, from information received in step 400, 410, or 450 of FIG. 4. If equation (40) had expressed $C_M(t)$ as trigonometric function γ*tan h($t_R$)+δ, the same considerations would apply to coefficients γ and δ.

Figure 6B:
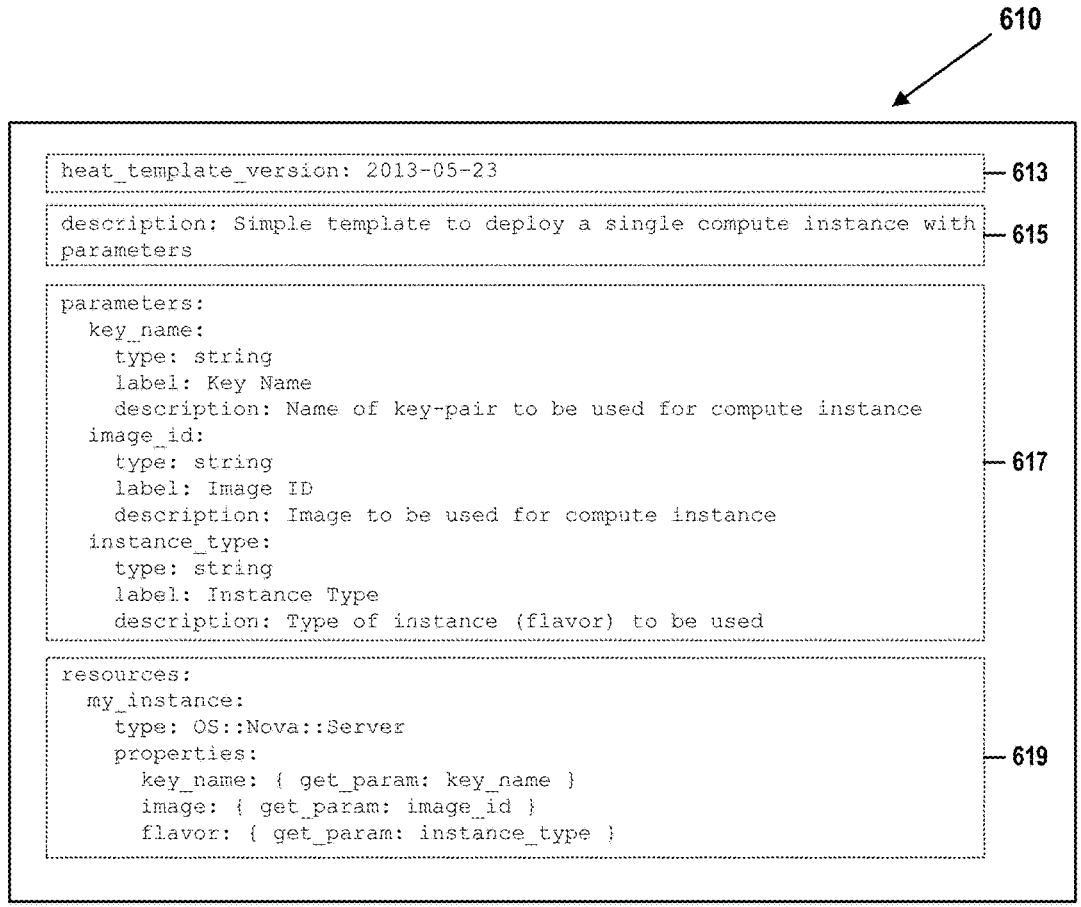
FIG. 6B shows a first example of an orchestration template, derived in conformance with embodiments of the present invention.

FIG. 6B shows a first example of an orchestration template 610 for exemplary cloud configuration 500 of FIG. 5, derived in conformance with embodiments of the present invention. FIG. 6B contains items 610-619. The system, by methods analogous to step 430 of FIG. 4, may translate the equations derived above into this template 610 for cloud $C_M$ 500.

Although exemplary template 610 is formatted to comply with conventions of Heat templates, other embodiments of the present invention may generate orchestration templates that conform to any orchestration template convention or automated-deployment service desired by an implementer.

It is beyond the scope of this document to describe in detail known methods of generating an orchestration template through use of templates. Those skilled in the art will be able to use known methods to generate templates like template 610 from the CDL notation described in this document. For example, a skilled implementer or equivalent module of an automated deployment system, upon determining that CDL equation (10) specifies a cloud $C_M$ 500 THAT consists of a single virtual machine V 530, would be able to generate the orchestration template 610, which specifies a deployment consisting of a single virtual machine.

In this example, template 610 is built from a template that contains the following standard sections:
- a "Template version" section 613 identifies the version of the scripting language used to generate the contents of the template;
- a "Description" section 615 is a natural-language description of the contents of the template;
- a "Parameters" section 617 describes input parameters that may be used to customize each deployed instance of a virtual component, such as the type of image used to deploy the instance and the data format of the parameter that identifies the image type (in this case, a string variable); and
- a "Resources" section 619 specifies resources that may be accessed in order to deploy the instances described by the template.

Other types of templates, including some based on the Heat conventions, may comprise other sections. In all cases, however, those skilled in the art, including software modules of automated deployment systems, may use known conventions to structure a template as a function of a topology described by the CDL code.

Similarly, in the following examples, including FIG. 7, the automated deployment system, upon determining that CDL-based cloud descriptions describe environments populated by virtual machines or applications configured to run sequentially, independently, in parallel, or in active/standby mode, would use known methods to translate these determined topologies into orchestration templates that conform to known conventions.

Although methods of generating a template that describes how to deploy a specific cloud topology are known, embodiments of the present invention improve known methods by providing an additional level of automation. This additional level is provided by the ability of the cloud-definition language to concisely describe a cloud topology in a manner capable of allowing downstream automated modules to predict performance characteristics of the described cloud and to automatically generate an orchestration template suitable for deploying even a complex cloud.

Finally, by any means known in the art, an orchestration module of the automated-deployment system uses known means to deploy cloud $C_M$ 500 in accordance with the orchestration template 610.

FIG. 7 shows a second example of an orchestration template 700 for exemplary cloud configuration 510 of FIG. 5, derived in conformance with embodiments of the present invention. As in the examples of FIGS. 6A and 6B, this orchestration template may be derived by means of the procedure of FIG. 4.

As in the examples of FIGS. 6A and 6B, an automated deployment system in the example of FIG. 7 receives e a set of requirements that describe virtual components to be deployed in a cloud-computing environment, as well as workloads expected for each of the described components. Here, the system will deploy a cloud-computing environment $C_M$ 510 that comprises n virtual machine instances 513a-513d configured as components of a sequential process. In this example, we refer to instance 513a as V1, 513b as V2, 513c as V3, 513d as Vn.

As described in step 410 of FIG. 4, the system also receives previously logged or empirically determined data that describes performance characteristics of previously deployed instances of virtual machines similar to instances 513a-513d.

For illustrative purposes, each instance 513a-513d is assumed to have response-time and throughput performance characteristics similar to those represented by graph 600. In real-world embodiments, however, each deployed virtual-machine instance may have different performance characteristics. In such cases, equations (11)-(31) below would be adjusted to replace the product of n identical response-time functions of n instances 513a-513d with a product of the n different response-time functions of the n instances 513a-513d and to replace the product of n identical throughput functions of n instances 513a-513d with a product of the n different throughput functions of the n instances 513a-513d.

In the example of FIG. 7, the CDL notation represents the parallel topology of the n virtual machines 513a-513d as a sum, yielding the CDL definition of cloud $C_M$ 510:

$$C_M = (V1 + V2 + V3 + \ldots + Vn) \tag{11}$$

In more complex cloud topologies, this methodology can be elaborated to represent each subset of sequentially configured virtual machines as a summed group. In this way, CDL can be used to concisely represent complex cloud topologies that comprise multiple groups of sequentially configured virtual resources.

As in the previous example, the received historical information may be used to predict response times and throughputs of each virtual machine 513a-513d as functions of workload. Here, previous single-VM equations (20)-(40) are modified in a straightforward manner to represent performance characteristics of n sequentially configured machines 513a-513d in cloud 510:

$$C_M = f(r,t) \tag{21}$$

$$C_M(r) = n^*(\alpha e^{aR} + \beta) \tag{31}$$

$$C_M(t) = (1/n) * \left( \gamma \left( \frac{t_R}{\sqrt{(1+t_R)}} \right) + \delta \right) \tag{41a}$$

$$C_M(t) = (1/n) * (\gamma^* \tan h(t_R) + \delta) \tag{41b}$$

Equation (21) states that cloud $C_M$ may be described as a function of cloud $C_M$'s response time r and throughput t.

Equation (31) defines the expected response time $C_M(r)$ of cloud $C_M$ as being proportional to a product of n iterations of exponential function $e^{tR}$. As in the previous example, coefficients α and β may be determined empirically, in order to quantify function $C_M(r)$, from information received in step 400, 410, or 450 of FIG. 4.

Equation (41a) defines the expected throughput performance $C_M(t)$ of cloud $C_M$ as being proportional to the function of equation (02) and weighted by a factor 1/n. As before, coefficients γ and δ may be determined empirically, in order to quantify function $C_M(t)$, from information received in step 400, 410, or 450 of FIG. 4. Equation (41b) expresses the same equation as an equivalent trigonometric function.

As in the preceding example, and in accordance with steps 430 and 440 of FIG. 4, the above equations may be translated by any means known in the art into an orchestration template that is then used to deploy components of the virtualized environment 510. One example of such an orchestration template 700 is illustrated in FIG. 7. Template 700 is a Heat-compatible example of an orchestration template that may be used to deploy a cloud-computing environment containing n=2 sequentially configured virtual machine instances. As can be seen in FIG. 7, the Heat-compatible instructions of template 700 follow conventions analogous to those of template 610 of FIG. 6B. Each virtual-machine instance listed in template 700 is described by template code similar to the template code used to describe the single virtual-machine instance of template 610 of FIG. 6B.

Many other topologies may be represented by CDL code in a similar manner and the response times and throughputs of such topologies, as functions of workload, may be estimated in a similar manner.

For example, computing environment 520 of FIG. 5A shows a topology in which four virtual machine instances 523a-523d (V1 through V4), are run in parallel and managed by a load-balancing component of the environment 520 (not shown in the FIGURE).

Such a configuration might be represented by the CDL described in this document as:

$$C_M = (V1*V2*V3*V4) \qquad (12)$$

As before, a template-generation module of the automated deployment system, using means known in the art, can easily interpret this line of CDL code as representing a parallel topology. The module could then, using known template-based means, automatically generate a corresponding orchestration template in a desired format. When forwarded to an automated-deployment module, this template could then automatically deploy the topology of environment 520.

If, as in the previous examples, performance characteristics of each instance 523a-523d are defined by equations (01) and (02), response times and throughput of cloud 520 could be described by the equations:

$$C_M = f(r,t) \qquad (22)$$

$$C_M(r) = \alpha e^{tR} + \beta \qquad (32)$$

$$C_M(t) = k*n*\left(\gamma\left(\frac{t_R}{\sqrt{(1+t_R)}}\right)+\delta\right) \qquad (42a)$$

$$C_M(t) = k*n*(\gamma*\tan h(t_R)+5) \qquad (42b)$$

In this example, equations (22) and (32) are similar in form and function to equations (20) and (30).

Equation (42a) defines the expected throughput performance $C_M(t)$ of cloud $C_M$ as being proportional to the function of equation (02) and multiplied by the number of parallel virtual machines n (in this example, n would equal 4) and by an empirically determined coefficient k. As before, coefficients γ and δ may also be determined empirically, in order to quantify function $C_M(t)$, from information received in step 400, 410, or 450 of FIG. 4. Equation (42b) expresses equation (42a) as an equivalent trigonometric function.

In yet another example, computing environment 530 of FIG. 5A shows a topology in which one virtual machine V 533 is configured to operate in parallel with a database-management system application D 535. One example of such a configuration might be an environment where V 533 is a logging/recovery system that logs each transaction performed by DBMS D 535.

Elaborating upon the CDL of equation (11), the configuration of environment 530 might be represented by CDL code:

$$C_M = V+D \qquad (13)$$

In this example, retrieved empirical data indicates that the basic performance of instances 533 and 535 are defined by equations (01) and (02), but when they are run together, their performance characteristics drop by an empirically determined factor 1/ε. Response times and throughput of cloud 530 can be predicted by the equations:

$$C_M = f(r,t) \qquad (23)$$

$$C_M(r) = \alpha e^{tR} + \beta \qquad (33)$$

$$C_M(t) = 1/\varepsilon *\left(\gamma\left(\frac{t_R}{\sqrt{(1+t_R)}}\right)+\delta\right) \qquad (43a)$$

$$C_M(t) 1/\varepsilon*(\gamma*\tan h(t_R)+\delta) \qquad (43b)$$

In this example, other than the inclusion of the weighting factor 1/ε, equations (23)-(43b) are similar in form and function to equations (22)-(42b). As in previous examples, equation (13) may be used to generate an orchestration template capable of enabling an automatic deployment of planned computing environment 530. Equations (23)-(43b) may be used for purposes similar to those described above for equations (22)-(42b).

In yet another example, computing environment 540 of FIG. 5A elaborates upon the topology of environment 530 by presenting a high-availability active/standby version of the two-entity environment 530. This configuration 530 thus includes "active" instances of virtual machine V 543a and DBMS D 545a and virtually identical "standby" instances of virtual machine V' 543b and DBMS D' 545b.

As described above, an active/standby implementation normally runs in an active mode, in which "primary" or active instances 543a and 545a receive and process user requests and where standby instances 543b and 545b receive the same requests but do not process them.

In the event of a failure, however, the system automatically defaults to a passive "standby" mode, in which standby instances 543b and 545b become active and begin to process user requests. Once the failed instance 543a or 545a is repaired, the system returns to its normal operating state, in which all four entities 543a-545b receive user requests, but only the primary, normally active entities 543a and 545a process those requests.

$$C_M = V+D|V'+D' \qquad (14)$$

As before, a template-generation module of the automated deployment system, using means known in the art, can easily interpret line (14) as representing a topology that contains two primary components configured in parallel and two equivalent passive components that process transactions only when the primary components are inoperable. The module could then, using known template-based means, automatically generate a corresponding orchestration template in a desired format. When forwarded to an automated-deployment module, this template could then automatically deploy the topology of environment 520.

In this example, retrieved empirical data indicates, as in the previous example, that the basic performance of instances 543a, 545a, 543b and 545b are each defined by equations (01) and (02), and that running either pair of virtual machine and application in parallel reduces their performance characteristics by a factor 1/ε.

Because V 543a and V' 545a have identical performance characteristics and because D 543b and D' 545b have identical performance characteristics, equations (24)-(44b) are identical to equations (23)-(43b) of the previous example. Response times and throughput of cloud 540 can thus be predicted by equations:

$$C_M = f(r,t) \tag{24}$$

$$C_M(r) = \alpha e^{tR} + \beta \tag{34}$$

$$C_M(t) = 1/\varepsilon * \left( \gamma \left( \frac{t_R}{\sqrt{(1+t_R)}} \right) + \delta \right) \tag{44a}$$

$$C_M(t) = 1/\varepsilon * (\gamma * \tan h(t_R) + \delta) \tag{44b}$$

$$RTO = A/L + D/L \tag{45}$$

In this example, equations (24)-(44b) are similar in form and function to equations (23)-(43b). Equation (45), however, illustrates a new benefit that may be accrued from embodiments of the present invention.

In equation (45), RTO refers to a "Recovery Time Objective" of database D 545a, one of the many other related values that may be derived from embodiments of the present invention. If configuration 540 is intended to be a disaster-recovery site, RTO defines a maximum allowable duration of time for a failed process or component to return to operation after a failure.

In this example, RTO is defined in terms of A, a size of application D 545a in GB, and L, a link speed between the active and the standby sites in Mbps or Gbps. In other words, RTO identifies one way to express an expected duration of time required to transfer control from a failed primary database D 545a to a passive standby database D' 545b during a catastrophic failure. As with other performance characteristics, A and L can be identified or inferred from information received in step 400 or 410. Embodiments of the present invention are flexible enough to accommodate similar methods of quantifying other types of performance parameters.

As in previous examples, equation (14) may be used to generate an orchestration template capable of enabling an automatic deployment of planned computing environment 540. Equations (24)-(45) may be used for purposes similar to those described above for equations (22)-(42b).

The above examples are not meant to exhaustively illustrate all possible types of topologies that may be represented by the CDL described in this document. The independent, parallel, sequential, active/passive, and other topologies described here may be combined sequentially or in parallel, nested, or arranged in any other manner required to represent a planned cloud-computing environment. Such topologies may be straightforwardly represented by lines of the CDL by parenthesizing or otherwise grouping terms. Such a representation may then be translated into one or more orchestration templates through automated means known in the art, and the resulting templates may then be used to deploy the planned cloud-computing environment.

The embodiments and examples described above may also be used to estimate response times and throughput of the planned cloud-computing environment, as functions of expected workloads. This information may be forwarded to a human network administrator or cloud planner, or may be forwarded to other modules of the automated-deployment system. These other modules may use the forwarded performance information for a variety of purposes, such as resource-planning (to ensure that amounts or numbers of required resources are sufficient to allow the planned components to be provisioned) or quality-of-service assurance (to ensure that the underlying platform is able to provide required response times and throughput under expected load).

The examples and embodiments described in this document define only a few simple operators and syntactical structures of the CDL. The language may be further extended with additional simple operators, macro capabilities, complex operators built from simple operators, the ability to make system calls or include libraries, compilation or real-time interpretation features, an SDK interface, and other common computing-language features. This open-ended structure allows implementers to extend the CDL language as required to represent future types of virtual and non-virtual infrastructure, components, platforms, topologies, communications mechanisms, and overall computing environments.

Examples and embodiments of the present invention described in this document have been presented for illustrative purposes. They should not be construed to be exhaustive nor to limit embodiments of the present invention to the examples and embodiments described here. Many other modifications and variations of the present invention that do not depart from the scope and spirit of these examples and embodiments will be apparent to those possessed of ordinary skill in the art. The terminology used in this document was chosen to best explain the principles underlying these examples and embodiments, in order to illustrate practical applications and technical improvements of the present invention over known technologies and products, and to enable readers of ordinary skill in the art to better understand the examples and embodiments disclosed here.

What is claimed is:

1. An automated virtual-resource deployment system comprising a processor, a memory coupled to the processor, and a computer-readable hardware storage device coupled to the processor, the storage device containing program code configured to be run by the processor via the memory to implement a method for automated deployment of a virtualized computing environment, the method comprising:
receiving, by the virtual-resource deployment system, a set of requirements that enumerate virtual components of the virtualized computing environment, specify a topology of the virtualized computing environment, and describe a workload that is expected to be handled in the future by the virtualized computing environment;

retrieving, by the virtual-resource deployment system, empirical data from which it is configured to infer performance characteristics of each of the virtual components;

representing, by the virtual-resource deployment system, the topology as one or more lines of code written in a virtual-computing environment definition language, where the one or more lines of code written in the virtual-computing environment definition language consist of one or more lines of a cloud-definition language, and where the one or more lines of the cloud-definition language describe a cloud computing environment by:
sorting the virtual components into a set of groups;
specifying whether each virtual component of a first group of the set of groups should be configured to operate sequentially with, in parallel with, or independently of other virtual components of the first group; and
specifying whether each group of the set of groups should be configured to operate sequentially with, in parallel with, or independently of another group of the set of groups;

estimating, by the virtual-resource deployment system, a response time and a throughput of the virtualized computing environment as functions of the inferred performance characteristics and of the expected workload;

translating, by the virtual-resource deployment system, the one or more lines of code into an orchestration template that comprises configuration details required to deploy the virtualized computing environment; and automatically deploying, by the virtual-resource deployment system, the virtualized computing environment as a function of the orchestration template.

2. The virtual-resource deployment system of claim 1, where the inferred performance characteristics comprise a record of response times and throughputs of a previously deployed virtual machine.

3. The virtual-resource deployment system of claim 2, where the previously deployed virtual machine is of a same class as one of the enumerated virtual components.

4. The virtual-resource deployment system of claim 2, where the response times and throughputs are each associated with a concurrent load that identifies a number of concurrent users.

5. The virtual-resource deployment system of claim 2, where the response times and throughputs are each associated with a concurrent load that identifies a number of concurrent transactions.

6. The virtual-resource deployment system of claim 1, further comprising:
monitoring, by the virtual-resource deployment system, performance characteristics of the deployed virtualized computing environment; and
updating, by the virtual-resource deployment system, the empirical data as a function of the monitored performance characteristics.

7. A method for automated deployment of a virtualized computing environment, the method comprising:
receiving, by the virtual-resource deployment system, a set of requirements that enumerate virtual components of the virtualized computing environment, specify a topology of the virtualized computing environment, and describe a workload that is expected to be handled in the future by the virtualized computing environment;

retrieving, by the virtual-resource deployment system, empirical data from which it is configured to infer performance characteristics of each of the virtual components;

representing, by the virtual-resource deployment system, the topology as one or more lines of code written in a virtual-computing environment definition language, where the one or more lines of code written in the virtual-computing environment definition language consist of one or more lines of a cloud-definition language, and where the one or more lines of the cloud-definition language describe a cloud computing environment by:
sorting the virtual components into a set of groups;
specifying whether each virtual component of a first group of the set of groups should be configured to operate sequentially with, in parallel with, or independently of other virtual components of the first group; and
specifying whether each group of the set of groups should be configured to operate sequentially with, in parallel with, or independently of another group of the set of groups;

estimating, by the virtual-resource deployment system, a response time and a throughput of the virtualized computing environment as functions of the inferred performance characteristics and of the expected workload;

translating, by the virtual-resource deployment system, the one or more lines of code into an orchestration template that comprises configuration details required to deploy the virtualized computing environment; and automatically deploying, by the virtual-resource deployment system, the virtualized computing environment as a function of the orchestration template.

8. The method of claim 7, where the inferred performance characteristics comprise a record of response times and throughputs of a previously deployed virtual machine.

9. The method of claim 8, where the previously deployed virtual machine is of a same class as one of the enumerated virtual components.

10. The method of claim 8, where the response times and throughputs are each associated with a concurrent load that identifies a number of concurrent users.

11. The method of claim 8, where the response times and throughputs are each associated with a concurrent load that identities a number of concurrent transactions.

12. The method of claim 7, further comprising providing at least one support service for at least one of creating, integrating, hosting, maintaining, and deploying computer-readable program code in the computer system, wherein the computer-readable program code in combination with the computer system is configured to implement the receiving, the retrieving, the representing, the estimating, the translating, and the automatically deploying.

13. A computer program product, comprising a computer-readable hardware storage device having a computer-readable program code stored therein, the program code configured to be executed by an automated virtual-resource deployment system comprising a processor, a memory coupled to the processor, and a computer-readable hardware storage device coupled to the processor, the storage device containing program code configured to be run by the processor via the memory to implement a method for automated deployment of a virtualized computing environment, the method comprising:

receiving, by the virtual-resource deployment system, a set of requirements that enumerate virtual components of the virtualized computing environment, specify a topology of the virtualized computing environment, and describe a workload that is expected to be handled in the future by the virtualized computing environment;

retrieving, by the virtual-resource deployment system, empirical data from which it is configured to infer performance characteristics of each of the virtual components;

representing, by the virtual-resource deployment system, the topology as one or more lines of code written in a virtual-computing environment definition language, where the one or more lines of code written in the virtual-computing environment definition language consist of one or more lines of a cloud-definition language, and where the one or more lines of the cloud-definition language describe a cloud computing environment by:
sorting the virtual components into a set of groups;
specifying whether each virtual component of a first group of the set of groups should be configured to operate sequentially with, in parallel with, or independently of other virtual components of the first group; and
specifying whether each group of the set of groups should be configured to operate sequentially with, in parallel with, or independently of another group of the set of groups;

estimating, by the virtual-resource deployment system, a response time and a throughput of the virtualized computing environment as functions of the inferred performance characteristics and of the expected workload;

translating, by the virtual-resource deployment system, the one or more lines of code into an orchestration template that comprises configuration details required to deploy the virtualized computing environment; and automatically deploying, by the virtual-resource deployment system, the virtualized computing environment as a function of the orchestration template.

14. The computer program product of claim 13, where the inferred performance characteristics comprise a record of response times and throughputs of a previously deployed virtual machine.

15. The computer program product of claim 14, where the previously deployed virtual machine is of a same class as one of the enumerated virtual components.

16. The computer program product of claim 14, where the response times and throughputs are each associated with a concurrent load that identifies a number of concurrent users.

17. The computer program product of claim 14, where the response times and throughputs are each associated with a concurrent load that identifies a number of concurrent transactions.

* * * * *